United States Patent
Kolesnik et al.

(10) Patent No.: US 9,792,139 B2
(45) Date of Patent: Oct. 17, 2017

(54) SERVICE DRIVEN VIRTUAL MACHINE SCHEDULING

(71) Applicant: Red Hat Israel, Ltd., Raanana (IL)

(72) Inventors: Michael Kolesnik, Ramat-Gan (IL); Moti Asayag, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 36 days.

(21) Appl. No.: 14/630,896

(22) Filed: Feb. 25, 2015

(65) Prior Publication Data
US 2016/0246634 A1 Aug. 25, 2016

(51) Int. Cl.
*G06F 9/50* (2006.01)
*G06F 9/455* (2006.01)

(52) U.S. Cl.
CPC ............ *G06F 9/45558* (2013.01); *G06F 9/50* (2013.01); *G06F 2009/4557* (2013.01)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS

| | | |
|---|---|---|
| 8,209,685 B1 | 6/2012 | Getlin et al. |
| 8,681,821 B1 | 3/2014 | Vincent |
| 8,762,190 B1 | 6/2014 | Solomon et al. |
| 8,918,784 B1 | 12/2014 | Jorgensen et al. |
| 2011/0185063 A1* | 7/2011 | Head ................... G06F 9/5077 709/226 |
| 2012/0180041 A1* | 7/2012 | Fletcher ............. G06F 9/45558 718/1 |
| 2013/0042123 A1* | 2/2013 | Smith ................... G06F 9/5094 713/300 |
| 2013/0185474 A1 | 7/2013 | Ge et al. |
| 2014/0143401 A1 | 5/2014 | Carlen et al. |
| 2014/0229933 A1* | 8/2014 | Kanungo ............ G06F 9/45558 718/1 |
| 2014/0282507 A1 | 9/2014 | Plondke et al. |
| 2015/0095597 A1* | 4/2015 | Ayanam ................ G06F 3/065 711/162 |

FOREIGN PATENT DOCUMENTS

CN 103701934 A 4/2014

OTHER PUBLICATIONS

Array Network, SSL Offloading and Acceleration in Virtualized Environments, 2017.*
Gamage et al., Protocol Responsibility Offloading to Improve TCP Throughput in Virtualized Environments, 2013.*
(Continued)

*Primary Examiner* — H S Sough
*Assistant Examiner* — Zhan Chen
(74) *Attorney, Agent, or Firm* — Lowenstein Sandler LLP

(57) ABSTRACT

The method including, receiving, from a management interface, an external services request, wherein the external services request comprises external service criteria for a virtual machine. The method further including identifying, by an external services scheduler, a hypervisor with external services that meet the external service criteria of the virtual machine. The method further including causing the virtual machine to be connected to the identified hypervisor.

10 Claims, 5 Drawing Sheets

(56) References Cited

OTHER PUBLICATIONS

Demartek, Storage Protocol Offload for Virtualized Environments, 2016.*
Fujitsu Technology Solutions, "Performance Report Hyper-V," White Paper, Version 2.0, Feb. 2010, 29 pages.
Openstack Open Source Cloud Computing Software, "Enable live migration with one nova computer," Dec. 29, 2014, 3 pages.

* cited by examiner

SERVICE DRIVEN VIRTUAL MACHINE SCHEDULING

TECHNICAL FIELD

This disclosure relates to the field of virtualization and, in particular, to the provisioning of access to external services.

BACKGROUND

External services may be employed in a virtualization environment to provide services not natively offered by the virtualization environment. External services may also provide offloading of services typically handled internally in the virtualization environment. To utilize available external services, elements of a management system of the virtualization environment, such as virtual machines, hypervisors, and virtualization managers, may be modified.

DESCRIPTION OF EMBODIMENTS

Virtual machine technologies are described herein.

External service providers can provide virtual machines with services external to virtualization environments (e.g., external services). The external services can include networking services, storage services, virtual machine (VM) hosting services, load balancing services, virtual private network (VPN) services, computational services (e.g., offloading of processor-intensive VM processes), and so forth. The external services can include virtual services and/or non-virtual services (e.g., physically-based) services. Virtualization managers, hypervisors, and VMs in a virtualization environment can use the external services. For example, the virtualization managers, hypervisors, and VMs can use the external services to access services not natively offered by the virtualization environment. In another example, the use of external services can ease virtualization environment management and implementation by tasking an external service provider with the responsibility of handling one or more networks of the virtualization environment.

Traditionally, external services provided by the external service providers can be outside of a control of a management system in a virtualization environment. The management system may be unaware of which hypervisors in the virtualization environment can supply external services to which virtual machines (VMs). Because the management system is unaware of the external resources available to the hypervisors, traditional management systems may initially schedule hypervisors (having unknown external services) with VMs at random. The management system can continue to randomly schedule the hypervisors with VMs until hypervisors compatible with the resource and service criteria of VMs can be matched with the VMs. Randomly scheduling hypervisors with VMs until compatible matches may be found causes noise within the virtualization environment and wastes processing resources of the virtualization environment.

Aspects of the present disclosure address the above noted deficiency by providing an external services scheduler that can connect a management interface (such as a VM scheduler) with an external system. The external services scheduler can query external services of the external system available to hypervisors (e.g., hypervisor information). The external services scheduler can communicate the hypervisor information to the management interface for the management interface to use to determine the hypervisors that may be compatible with the resource criteria of the VMs. An advantage of the external services scheduler providing the management interface with the hypervisor information can be to reduce an amount of VM and hypervisor scheduling (e.g., eliminate random scheduling) and provide the VMs with hypervisors meeting resources criteria.

Figure 1:
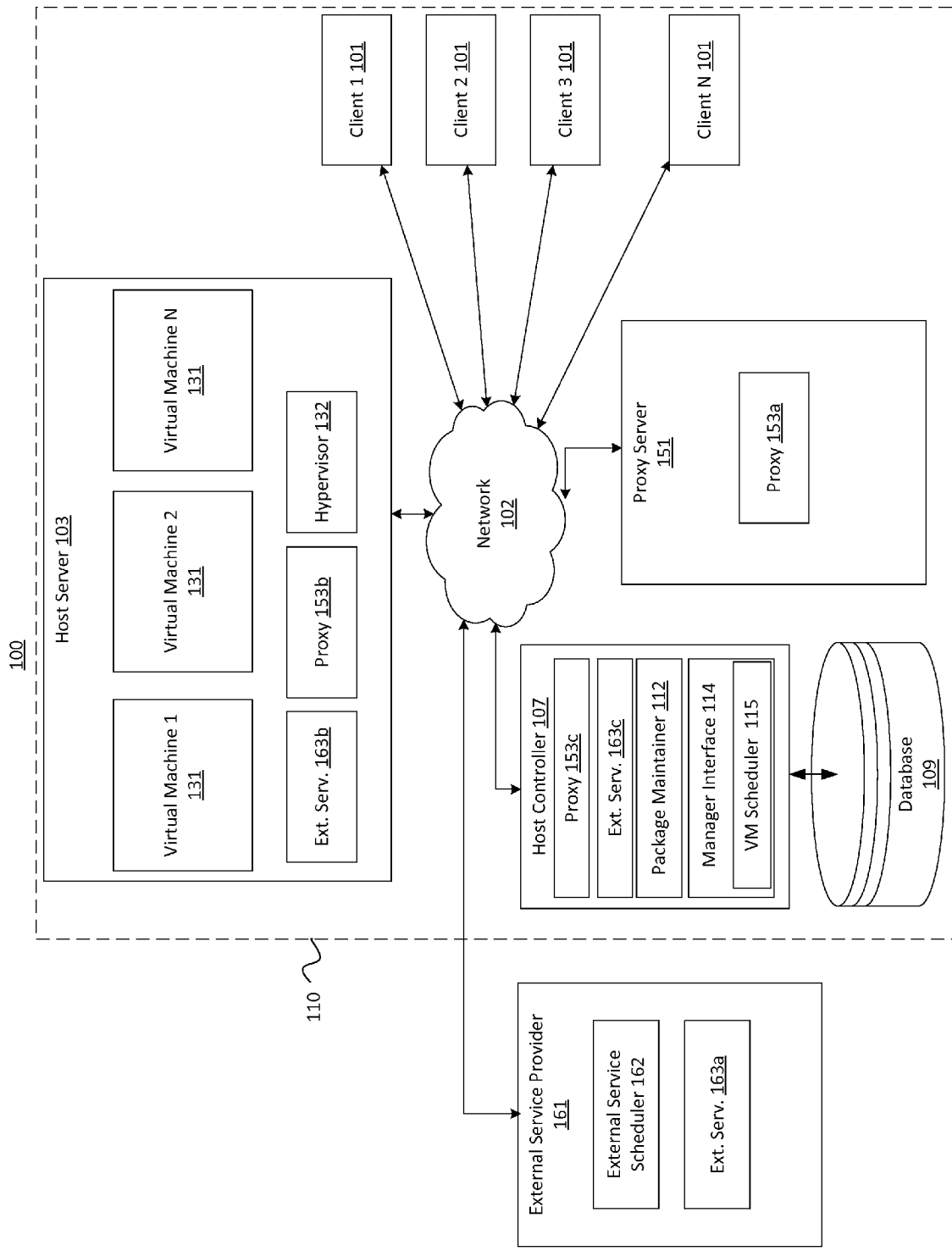
FIG. 1 illustrates a network architecture with a host server and an external service provider according to one embodiment.

FIG. 1 illustrates a network architecture 100 with a virtualization environment 110 and an external service provider 161. The virtualization environment 110 can include a host controller 107, a host server 103, clients 101, and a proxy server 151. The host server 103 coupled to clients 101 over a network 102. The network 102 may be a private network (e.g., a local area network (LAN), wide area network (WAN), intranet, etc.) or a public network (e.g., the Internet). The host server 103 may also be coupled to a host controller 107. In one example, the host server 103 can be coupled to the host controller 107 using the network 102 or a different network. In another example, the host server 103 can be directly coupled to the host controller 107. The host controller 107 may be an independent machine (such as a server computer or a desktop computer) or part of the host server 103.

The network architecture also includes one or more proxy servers 151 coupled together using network 102. In one example, the proxy servers 151 may be independent machines, such as server computers, desktop computers, and so forth. In another example, the proxy server 151 may be part of the host server 103 and/or part of the host controllers 107. The network architecture 100 can include one or more external service providers 161 coupled to the virtualization environment 110 using the network 102. In one example, the external service provider 161 may be an independent machine, such as a server computer, a desktop computer, and so forth. In another example, the external service providers 161 may be part of the host server 103 and/or part of the host controllers 107.

Proxies 153a, 153b, and 153c may receive information from external service 163a, external service 163b, and/or external service 163c, respectively. The proxies 153a, 153b, and 153c can use the received information to configure a connector. The proxy server 151 may include proxy 153a. The host server 103 may include proxy 153b. The host controller 107 may include proxy 153c.

The external service provider 161 may include an external service scheduler 162 and an external service 163a. The host server 103 may include external service 163b. The host controller 107 may include external service 163c. The external services 163a, 163b, and 163c may include networking services, storage services, virtual machine (VM) hosting services, VM services, load balancing services, virtual private network (VPN) services, and computational services.

The clients 101 may include computing devices that have a variety of processing capabilities. The clients 101 may serve as access terminals for users and depend primarily on the host server 103 for processing activities. For example, the clients 101 may be desktop computers, laptop computers, cellular phones, personal digital assistants (PDAs), and so forth. The clients 101 may run client applications such as a Web browser. The clients 101 may also run other client applications, which receive multimedia data streams or other data from the host server 103 and re-direct the received data to a local display or other user interface.

Host server 103 may include server computers or other computing devices capable of running one or more VMs 131. The VMs 131 can run guest operating systems (OSs). The guest OSs may vary between VMs 131. The guest OSs may include Microsoft Windows, Linux, Solaris, Mac OS, and so forth. The host server 103 may include a hypervisor 132 that emulates an underlying hardware platform for the VMs 131. The hypervisor 132 may be referred to as a virtual machine monitor (VMM) or a kernel-based hypervisor.

The VMs 131 can be accessed by one or more of the clients 101 over the network 102 and can provide a virtual desktop for the clients 101. From a user's point of view, the virtual desktop functions as a physical desktop (e.g., a personal computer) and may be indistinguishable from an actual physical desktop. The VMs 131 may be linked to one or more virtual disks. The virtual disks can be logical partitions of a physical disk memory managed by hypervisor 132, cloud-based storage devices, or other types of virtual storage devices.

The VMs 131 and virtual disks may be managed by the host controller 107. The host controller 107 may manage the allocation of resources from host server 103 to VMs 131. In addition, host controller may monitor a status of the VMs 131 as well as the progress of commands and processes being executed by the VMs 131. The host controller 107 may include a virtualization manager or management interface 114 to perform management operations in the virtualization environment 110, including allocating resources of host server 103 to VMs 131, monitoring a status of the VMs 131, monitoring the progress of commands and processes being executed by VMs 131, and so forth. The manager interface 114 can include a VM scheduler 115 to communicate with an external service provider 161.

The host controller 107 may also maintain a management database 109 used by the manager interface 114. In one example, the host controller 107 can include a package maintainer 112 to install, upgrade, or configure software packages on the host controller 107.

In one example, the VMs 131 (hosted by hypervisor 132) may be consumer of external services 163a, 163b, and/or 163c, such as networking services. In another example, the external services 163a, 163b, and/or 163c may be storage services employed by the hypervisor 132 for accessing disk images of VMs 131 hosted by the hypervisor 132. In another example, the manager interface 114 may be a consumer of the external services 163a, 163b, and/or 163c, such as VM hosting services employed by the manager interface 114 as a source of VM hosts to be subject to its management (e.g., hosts to which VMs 131 can be deployed).

Figure 2B:
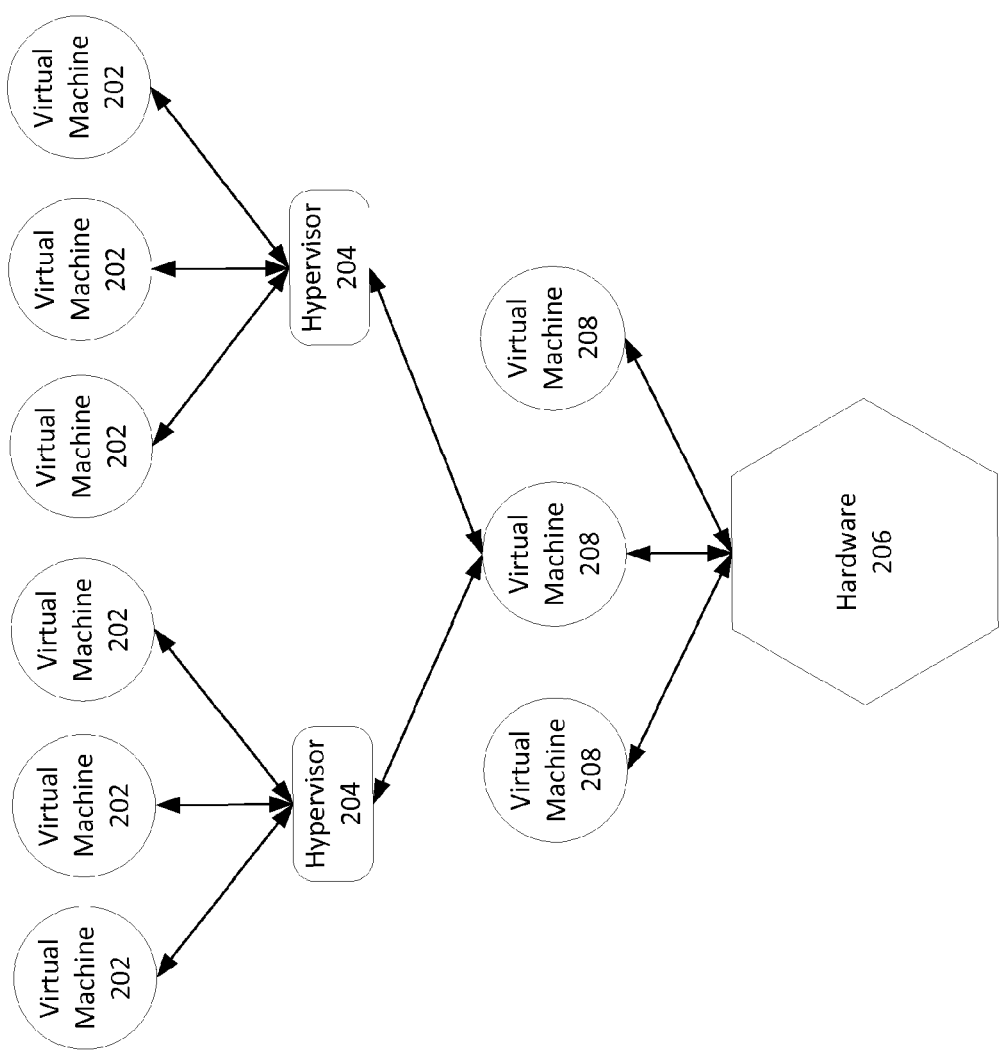
FIG. 2b illustrates hypervisors running on virtual machines according to one embodiment.
Figure 2A:
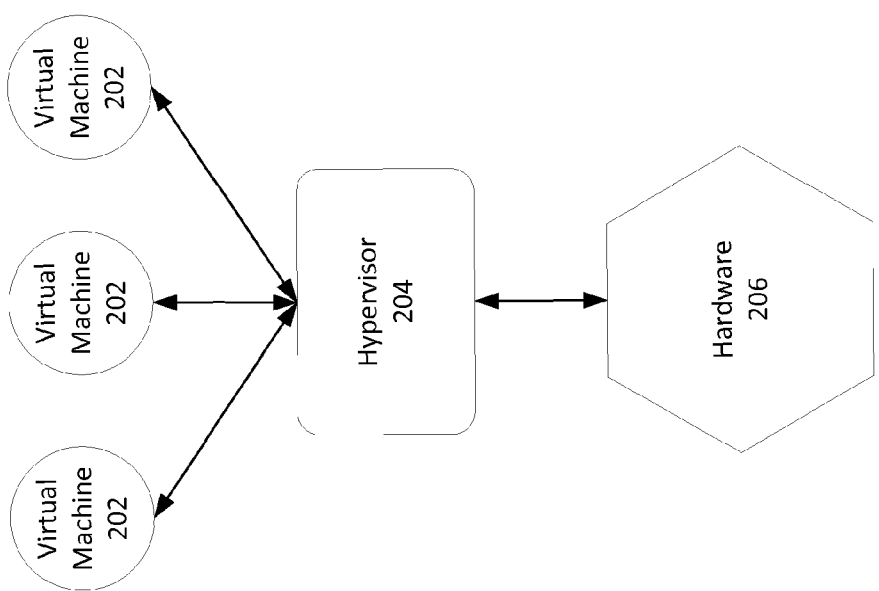
FIG. 2a illustrates a hypervisor running directly on a host machine and managing the hardware and the virtual machines according to one embodiment.

FIGS. 2a and 2b illustrate hypervisors 204 interfacing between VMs 202 and hardware 206. A hypervisor or virtual machine monitor (VMM) 204 can be software, firmware, or hardware that creates and runs VMs 202. A computer on which the hypervisor 204 may be running one or more VMs can be a host machine and the VMs 202 can be guest machines. The hypervisor 204 can provide the VMs 202 with virtual operating platforms and can manage an execution of the VMs 202. The VMs can share the hardware 206.

FIG. 2a illustrates hypervisor 204 running directly on a host machine and managing the hardware 206 and the VMs 202, in accordance with some implementations. The VMs 202 may run as a process, a program, or part of the host operating system on the host machine.

FIG. 2b illustrates hypervisors 204 running on VMs 208, in accordance with some implementations. The hypervisors 204 can manage the VMs 202 and can indirectly manage the hardware 206 via the VMs 208. The hypervisors 204 can run similar to other computer programs running on the VMs 208. The VMs 208 can abstract the VMs 202 from the host machine.

When the hypervisors 204 are installed in a virtualization environment, the hypervisors 204 can be assigned a universally unique identifiers (UUIDs). The UUIDs can identify the hypervisors 204 and services and resources which may be running on the hypervisors 204, such as external services or hardware 206. A management interface can query an external system (including external services and hardware 206) associated with the hypervisors 204, such as by using an application programming interface (API) of the hypervisors 204, to determine resources and services (such as external services) available to the hypervisors 204. The management interface can a software interface between the hypervisor 204 and the external service provider. The management interface can communicate information indicating the available resources and services to a VM scheduler. The VM scheduler can connect VMs 202 having resource criteria requirements to the hypervisors 204 with matching available resources. The management interface can connect the VMs 202 with the hypervisors 204 based on the information provided by the management interface.

Figure 3:
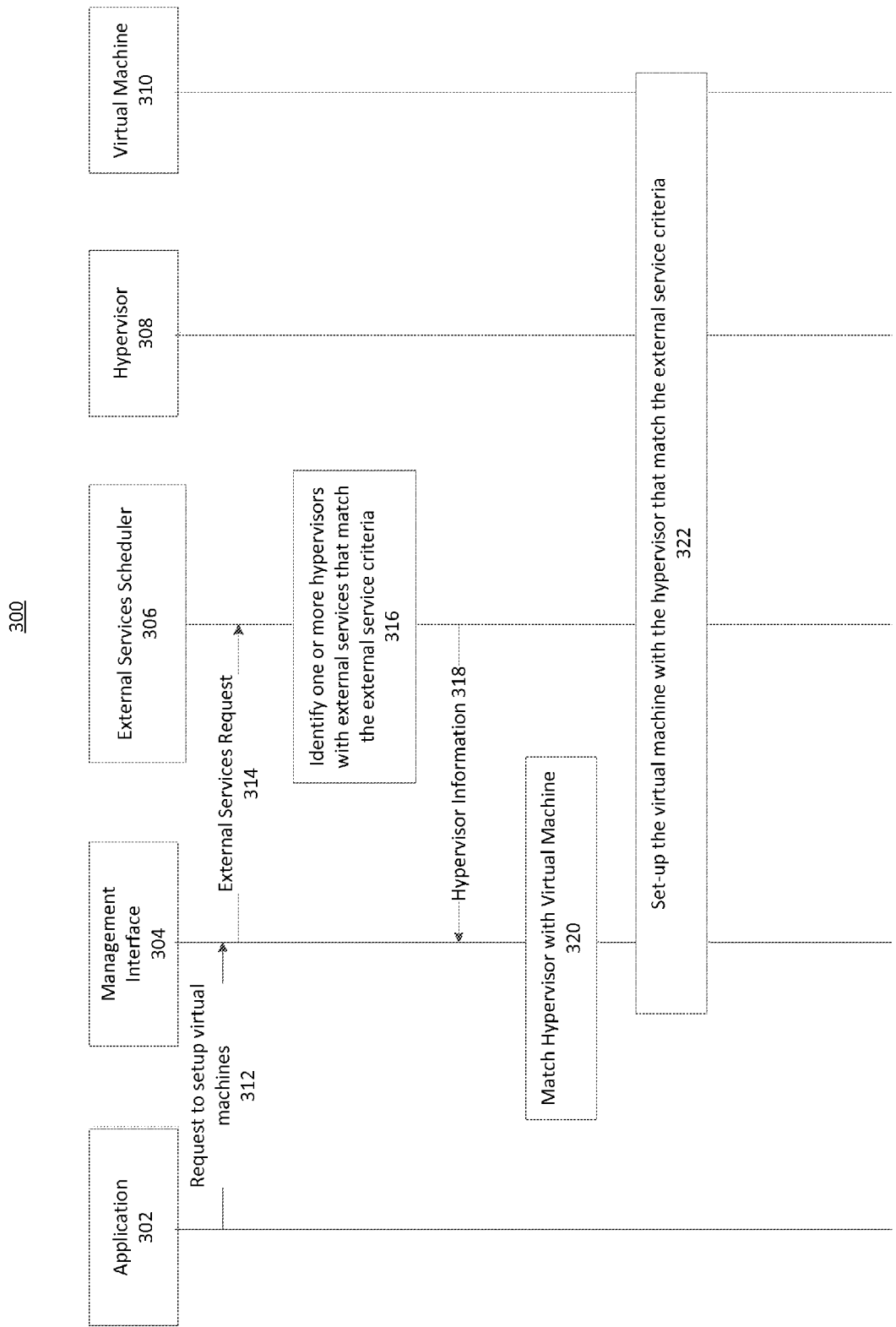
FIG. 3 illustrates a sequence diagram of a method of a management interface connecting a virtual machine with a hypervisor that meets external service and resource criteria of the virtual machine according to one embodiment.

FIG. 3 illustrates a sequence diagram of a method of connecting a VM 310 to a hypervisor 308 with external services that meet external service criteria of the VM 310. The method can begin with an application 302 sending a request to a management interface 304 requesting that the management interface 304 set up a VM 310 (block 312). The application 302 can be a software interface between a system administrator and the management interface 304. The request can include external service criteria for the VM 310. The external service criteria can include storage capacity criteria, processor power criteria, networking capability criteria, and so forth. The application 302 can send the request in response to a user request to schedule a VM, a clash or conflict between VMs in a virtualization environment, a maintenance of a VM in the virtualization environment, and so forth. The management interface 304 can send an external services request to an external services scheduler 306 requesting hypervisor information indicating a hypervisor that meets the external service criteria (block 314). When the external services scheduler 306 receives the external services request, the external services scheduler 306 can identify one or more hypervisors, such as hypervisor 308, with external services that meet the external service criteria (block 316).

In one example, the external services scheduler 306 can maintain a database for the hypervisors in the virtualization environment. The database can include universal unique identifiers (UUIDs) that can indicate the hypervisors within the virtualization environment and external services associated with the hypervisors. In this example, the external services scheduler 306 can query the UUIDs in the database to determine the hypervisors that may meet the external service criteria. In another example, the external services scheduler 306 can send a request to the hypervisors in the virtualization environment requesting that the hypervisors send external services information indicating the external services available to the hypervisors. In one example, the external services scheduler 306 can query the external services information to identify the hypervisors that meet or match the external service criteria. For example, the external services request can indicate that the external service criteria for the VM include a hypervisor with external services that have a memory storage capacity of N gigabytes (such as external storage devices connected to the hypervisor). In this example, the external services scheduler 306 can query the database to identify one or more hypervisors with external services that have at least N gigabytes of storage capacity. In another example, the external services request can indicate that the external service criteria for the VM include a hypervisor with external services that can process data at N gigahertz (such as an external processing device connected to the hypervisor). In this example, the external services scheduler 306 can query the database to identify one or more hypervisors with external services that have at least N gigahertz of processing capability.

In one example, the external services scheduler 306 can update the UUIDs in the database with the received external services information. An advantage of using the external services information, received from the hypervisors, can be that the external services information can provide real-time or up-to-date external services information regarding the external services of the hypervisors. The real-time or up-to-date external services information can enable the external services scheduler 306 to provide real-time or up-to-date hypervisor information for the management interface 304 used to match hypervisors with VMs (e.g., dynamically match the hypervisors with the VMs).

When the external services scheduler 306 identifies the hypervisors that meet the external service criteria, the external services scheduler 306 can communicate hypervisor information to the management interface 304 indicating the hypervisors that meet the external service criteria, such as a list of the hypervisors that meet the external service criteria (block 318). The management interface 304 can determine that hypervisor 308 meets the external service criteria based on the hypervisor information (block 320).

The management interface 304 can determine what hypervisors, identified in the hypervisor information, are available to match with the VM 310. In one example, the management interface 304 can determine that a hypervisor is unavailable when the hypervisor is currently connected to one or more VMs. In another example, the management interface 304 can determine that a hypervisor is unavailable when the hypervisor is running or actively controlling hardware and a VM. In another example, the management interface 304 can remove unavailable hypervisors from the hypervisor information. The management interface 304 can set-up the VM 310 with the hypervisor 308 that meets the external service criteria (block 322).

Figure 4:
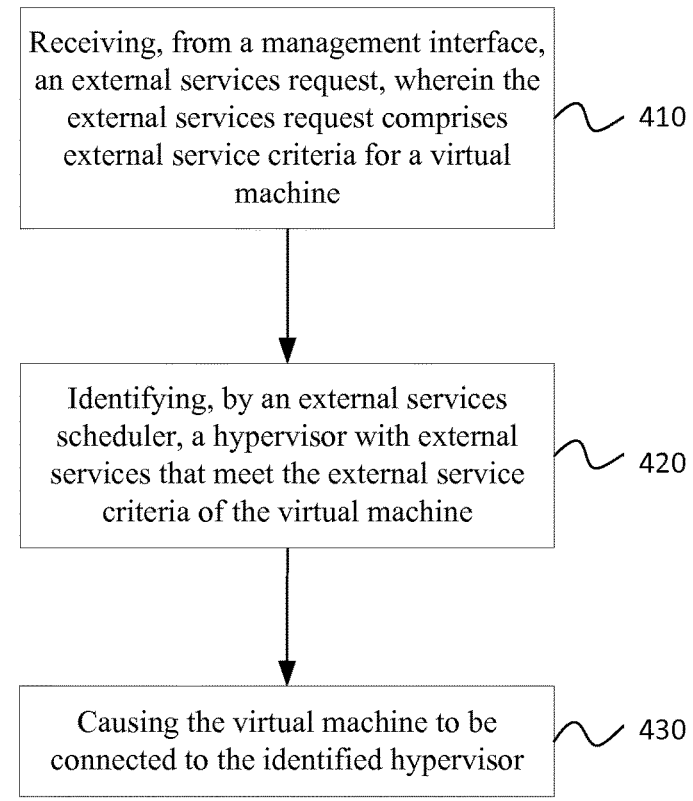
FIG. 4 is a flow diagram of a method for identifying a hypervisor that meets the external service criteria according to one embodiment.

FIG. 4 is a flow diagram of a method 400 for identifying a hypervisor meeting the external service criteria. Method 400 may be performed by processing logic that may comprise hardware (e.g., circuitry, dedicated logic, programmable logic, microcode, etc.), software (such as operations being performed by the MCU), firmware or a combination thereof. In one example, method 400 is performed by processor, a plurality of processors, a processor core, and/or a plurality of processor cores. Alternatively, other components of a computing system or software executing on the processor may perform some or all of the operations of the method 400.

Referring to FIG. 4, the method 400 can begin by receiving, from a management interface, an external services request, wherein the external services request comprises external service criteria for a virtual machine (block 410). The method can include identifying, by an external services scheduler, a hypervisor with external services that meet the external service criteria of the virtual machine (block 420). The method can include causing the virtual machine to be connected to the identified hypervisor (block 430).

In one example, the method can further include identifying the hypervisor with the external services by querying a database of information identifying the hypervisors in a virtualization environment and external services associated with the hypervisors. In another example, information identifying the hypervisors in the virtualization environment and external services associated with the hypervisors can be universal unique identifiers (UUIDs). In another example, the method can further include: sending a request to the hypervisors in a virtualization environment requesting that hypervisors send external services information indicating the external services available to the hypervisors; receiving, at the external services scheduler, external services information; and analyzing, by the external services scheduler, the external services information to identify the hypervisors that meet the external service criteria.

In one example, identifying the hypervisor can further include: sending a request to the hypervisors in a virtualization environment requesting that hypervisors send external services information indicating the external services available to the hypervisors; receiving, at the external services scheduler, external services information; and updating, by the external services scheduler, the database with the received external services information. In another example, the external service criteria can include: networking service criteria, such as bandwidth availability or network connections available for communicating information; storage service criteria, such as an amount of storage capacity may be available for storing data on an external storage device; VM hosting service criteria, such as a compatibility of the external services with the VM; load balancing service criteria, such as a capability of balancing Internet traffic of the VM; virtual private network (VPN) service criteria, such as a compatibility of the VPN with the VM; processor power criteria, such as a processor with a minimum processing speed; or computational service criteria such as an amount of processing power available to run computationally heavy processes or programs. In another example, the external services can include virtual services or non-virtual services. In another example, the external services can be services external to a virtualization environment.

Figure 5:
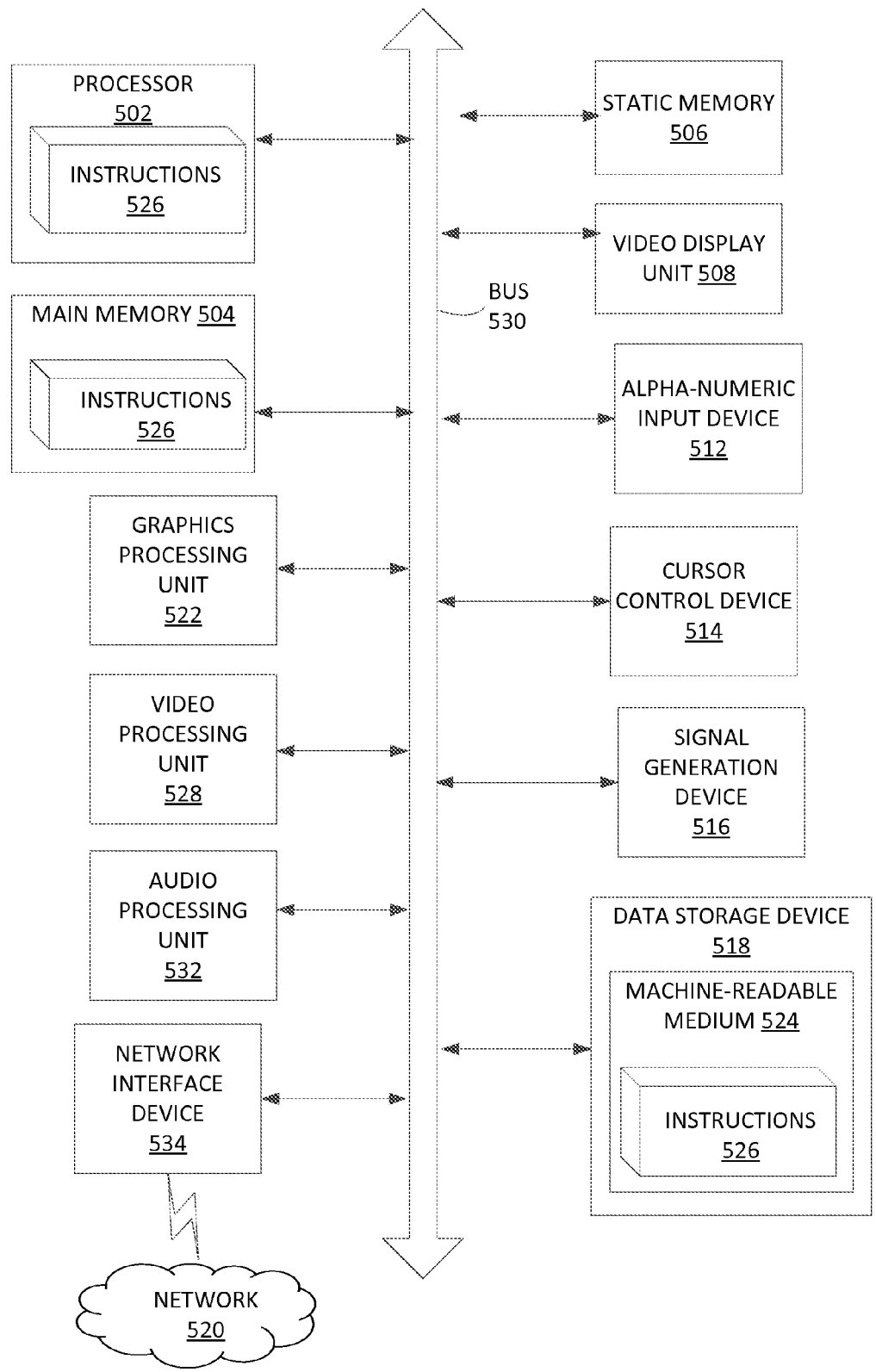
FIG. 5 illustrates a block diagram of one implementation of a computer system.

FIG. 5 illustrates a diagrammatic representation of a machine in the exemplary form of a computer system 500 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 508 (e.g., a liquid crystal display (LCD), a cathode ray tube (CRT), or a touch screen), an alphanumeric input device 512 (e.g., a keyboard), a cursor control device 514 (e.g., a mouse), and a signal generation device 516 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 520 via the network interface device 534.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
   a memory comprising a set of instructions; and
   a processing device operatively coupled to the memory, the processing device to execute the set of instructions to implement an external services scheduler to:
   receive an external services request, wherein the external services request comprises external service criteria for a virtual machine, wherein the external services are services identified by a universal unique identifier (UUID) as services external to a virtualization environment and outside a control of a management system in the virtualization environment;
   send a first request to a first hypervisor in the virtualization environment requesting that the first hypervisor send external services information indicating external services available to the first hypervisor;
   receive the external services information from the first hypervisor;
   send a second request to a second hypervisor in the virtualization environment requesting that the second hypervisor send external services information indicating external services available to the second hypervisor;
   receive the external services information from the second hypervisor;
   analyze the external services information from the first hypervisor and the second hypervisor to determine that the external services available to the first hypervisor meet the external services criteria; and
   cause the virtual machine to be operatively coupled to the identified first hypervisor.

2. The apparatus of claim 1, wherein the external services scheduler is further to
   update a database with the received external services information from the first hypervisor and the second hypervisor, wherein the database comprises information to identify the external services and a plurality of hypervisors.

3. The apparatus of claim 1, wherein the external service criteria comprises one or more of networking service criteria, storage service criteria, virtual machine (VM) hosting service criteria, load balancing service criteria, virtual private network (VPN) service criteria, processor power criteria, networking capability criteria, or computational service criteria.

4. The apparatus of claim 1, wherein the external services comprise one or more of virtual services or non-virtual services.

5. A non-transitory computer-readable storage medium comprising executable instructions that, when executed by a processing device, cause the processing device to:
   receive an external services request requesting hypervisor information, wherein the external services request comprises external service criteria associated with a virtual machine and the external services are services identified by a universal unique identifier (UUID) as services external to a virtualization environment and outside a control of a management system in the virtualization environment;
   send a first request to a first hypervisor in the virtualization environment requesting that the first hypervisor send external services information indicating external services available to the first hypervisor;
   receive the external services information from the first hypervisor;
   send a second request to a second hypervisor in the virtualization environment requesting that the second hypervisor send external services information indicating external services available to the second hypervisor;
   receive the external services information from the second hypervisor;
   analyze the external services information from the first hypervisor and the second hypervisor to determine that the external services available to the first hypervisor meet the external services criteria; and
   cause the virtual machine to be operatively coupled to the first hypervisor.

6. The non-transitory computer-readable storage medium of claim 5, the processing device is further to:
   determine when a third hypervisor is unavailable; and
   remove the third hypervisor the hypervisor information.

7. A method, comprising:
   receiving, from a management interface, an external services request, wherein the external services request comprises external service criteria for a virtual machine and the external services are services identified by a universal unique identifier (UUID) as services external to a virtualization environment and outside a control of a management system in the virtualization environment;
   send a first request to a first hypervisor in the virtualization environment requesting that the first hypervisor send external services information indicating external services available to the first hypervisor;
   receive, at a processing device, the external services information from the first hypervisor;
   send a second request to a second hypervisor in the virtualization environment requesting that the second hypervisor send external services information indicating external services available to the second hypervisor;
   receive, at the processing device, the external services information from the second hypervisor;
   analyze, by the processing device, the external services information from the first hypervisor and the second hypervisor to determine that the external services available to the first hypervisor meet the external services criteria; and
   causing the virtual machine to be operatively coupled to the first hypervisor.

8. The method of claim 7, further comprising:
   updating, by the processing device, a database with the received external services information from the first hypervisor and the second hypervisor, wherein the database comprises information to identify the external services and a plurality of hypervisors.

9. The method of claim 7, wherein the external service criteria comprises one or more networking service criteria, storage service criteria, virtual machine (VM) hosting service criteria, load balancing service criteria, virtual private network (VPN) service criteria, processor power criteria, networking capability criteria, or computational service criteria.

10. The method of claim 7, wherein the external services comprise one or more of virtual services or non-virtual services.

* * * * *